March 30, 1954
R. J. IFIELD ET AL
MEANS FOR REGULATING THE SUPPLY OF LIQUID
FUEL TO INTERNAL-COMBUSTION PRIME
MOVERS, FURNACES, AND THE LIKE
Filed Nov. 9, 1948
2,673,447
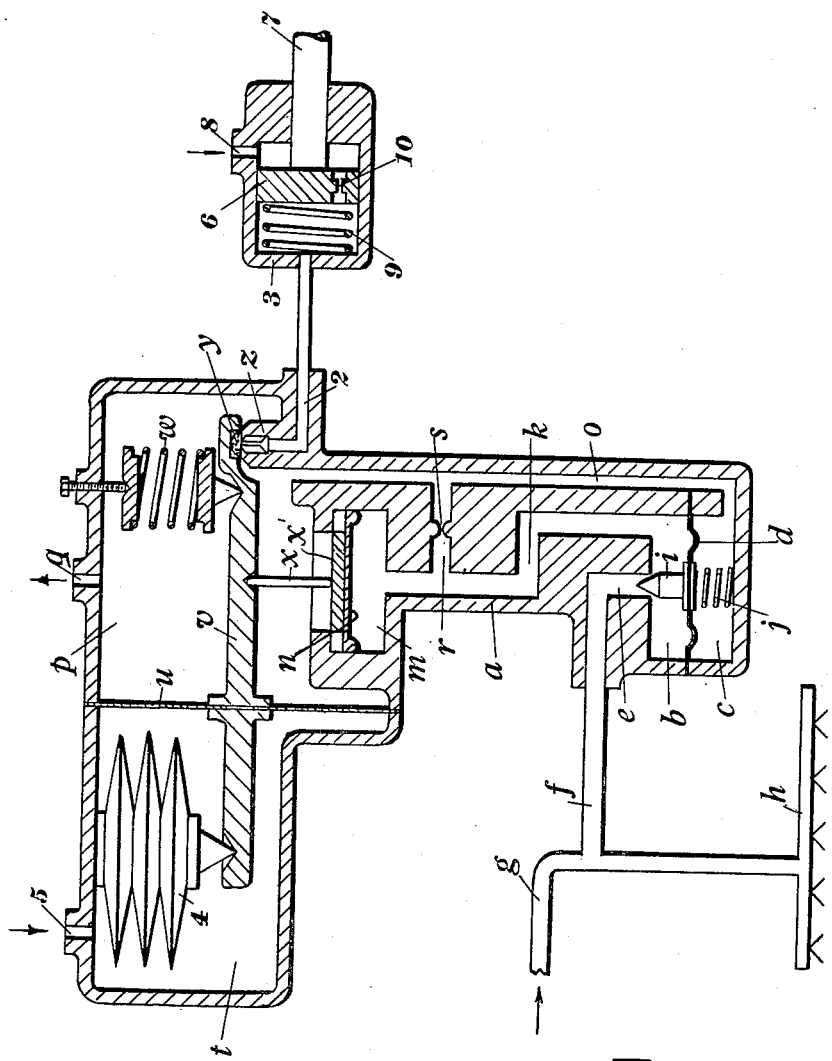
Inventors
R. J. Ifield
J. J. Righton
By Stewart Downing Tubbs
Attys.

Patented Mar. 30, 1954

2,673,447

UNITED STATES PATENT OFFICE 2,673,447

MEANS FOR REGULATING THE SUPPLY OF LIQUID FUEL TO INTERNAL-COMBUSTION PRIME MOVERS, FURNACES, AND THE LIKE

Richard Joseph Ifield, Dural, New South Wales, Australia, and Joseph John Righton, Birmingham, England, assignors to Joseph Lucas Limited, Birmingham, England Application November 9, 1948, Serial No. 59,136

Claims priority, application Great Britain November 17, 1947

8 Claims. (Cl. 60—39.28)

This invention has for its object to provide an improved system or arrangement for controlling a fluid-operated mechanism for regulating the supply of liquid fuel from a pump to the combustion chamber of a prime mover (such as a jet-propulsion engine, or internal combustion turbine), industrial furnace or the like.

The invention comprises the combination of a liquid fuel by-pass duct having therein a restricted orifice, a throttle at the entrance side of the said orifice, a diaphragm responsive to fluid pressure and in operative connection with the throttle, a second diaphragm responsive to the pressure of the fluid at the entrance side of the said orifice, a spring loaded lever in operative connection with the second diaphragm, a valve operable by the lever for controlling a fluid operated servo motor employed for varying the rate of supply of fuel to the combustion chamber, and a capsule acting on the lever, the capsule being responsive to (blower or atmospheric) air pressure.

The accompanying drawing illustrates diagrammatically one mode of carrying the invention into effect.

Referring to the drawing, we employ a body part $a$ in which are formed passages $e$, $k$, $r$ constituting a by-pass passage leading from a pipe $f$ to a restricted orifice $s$. The pipe $f$ receives liquid fuel from a main pipe $g$ which supplies liquid fuel to a burner $h$ from a pump. Between the parts $e$, $k$ of the by-pass passage is arranged a diaphragm $d$ which is loaded by a spring $j$ and carries a throttle $i$ for controlling the flow of liquid through the passage $e$ to a compartment $b$ at one side of the diaphragm, one end of the passage $k$ being in communication with that compartment. The compartment $c$ at the other side of the diaphragm communicates by way of a passage $o$ with one of the compartments of a bi-compartmental chamber to be hereinafter described, and the exit side of the restricted orifice $s$ communicates with the said passage $o$.

The throttle is required to admit fluid to the compartment $b$ at a pressure which is not only substantially lower than the pump delivery pressure, but also bears a predetermined relation thereto. For some purposes it is required that the pressure in the compartment $b$ shall be proportional to the square root of the pump delivery pressure. To meet this, or any other like requirement, the end of the throttle which controls the flow through the passage $e$ is appropriately shaped to a curved or straight tapering form, so that axial movement of the throttle relatively to the said passage is accompanied by the required variation of pressure in the compartment $b$.

At the upper end of the body part $a$ is arranged a chamber which is divided into two compartments $t$, $p$, by a diaphragm $u$, and adjacent to the compartment $p$ is formed a compartment $m$ which is separated from the compartment $p$ by a diaphragm $n$, the part of the compartment $m$ at one side of the diaphragm $n$ being in communication with the passages $k$, $r$ as shown. The compartment $p$ has an outlet $q$ leading to a sump or to the inlet side of the fuel pump. Resting on the diaphragm $n$ is a slidable member $x^1$ which supports the stem $x$ referred to hereinafter.

The diaphragm $u$ carries a lever $v$ and the portion of the lever $v$ in the compartment $p$ is loaded by an adjustable spring $w$ and has an operative connection with the diaphragm $n$ through a stem $x$. The free end of the lever carries or bears on a valve closure member $y$ co-operating with a seating $z$ at the entrance of a passage 2 leading to a servo-cylinder 3 to be hereinafter described.

In the compartment $t$ is arranged an evacuated elastic capsule 4 which at one end bears on the lever $v$. This compartment is open to the atmosphere, or is connected at 5 to a pipe leading to the outlet side of an air blower by which air is supplied to the combustion chamber containing the burner $h$.

The servo-cylinder 3 contains a piston 6 from which extends a rod 7 for actuating the output controlling mechanism of the fuel pump or other fuel controlling means. One end of the cylinder is supplied with motive fluid from the pump through a passage 8, and the piston is loaded by a spring 9. Further, both ends of the cylinder are in communication by way of a restricted orifice 10 which may be provided in the piston (as shown) or in a passage between the two ends of the cylinder. The arrangement is such that when the valve closure member $y$ is closed on its seating $z$, the fluid-pressure acting on the two sides of the piston 10 is balanced, and the spring 9 can then move the piston to the right for increasing the fuel supply. When the closure member is raised off its seating motive fluid can flow through the cylinder and the pressure difference acting on the piston can move it to the left for reducing the fuel supply. Instead of employing the piston rod 7 of the servo-mechanism for actuating the output controlling means of the pump it may be used to actuate a throttle valve or a by-pass in the pipe leading from the pump to the burner.

The mode of action of the apparatus above described is as follows:

The pressure of the liquid in the passage $k$ is determined by the throttle $i$ and the restriction $s$, and variation of the pump delivery pressure is accompanied by variation of the throttle opening. The diaphragm $n$ is subject to the difference of pressure at the opposite sides of the orifice $s$ and the lever $v$ is therefore subject to two pressures, namely the air pressure acting on the capsule $q$ and the differential fluid pressure acting on the diaphragm $n$, in addition to the pressure exerted respectively by the spring $w$. The effect of increase of air pressure on the capsule is to reduce the pressure exerted by the capsule on the lever, and so allow the spring to move the closure member $y$ towards its seating $z$. The effect of increase of liquid fuel pressure acting on the diaphragm $n$ is to move the closure member away from its seating in opposition to the spring $w$. Variation of either the air or the liquid pressure therefore causes the closure member to increase or retard the flow of liquid which operates the servo mechanism and thereby regulates in an appropriate manner the amount of fuel supplied to the combustion chamber.

By this invention we are able to provide an apparatus which is sensitive to variations of the pressures acting on it, and which at the same time is reliable in action and not susceptible to disturbance by accidental conditions such as friction. The invention is not, however, restricted to the example above described, and moreover we desire it to be understood that the term diaphragm is used herein as including an equivalent piston.

Having thus described our invention what we claim as new and desire to secure by Letters Patent is:

1. A control arrangement for regulating the supply of liquid fuel from a pump to a combustion chamber comprising, in combination, a fluid operated servo-mechanism for varying the rate of supply of fuel from the pump, a by-pass duct from the main pipe supplying liquid fuel to the combustion chamber, restricted orifice means in said by-pass duct, a throttle in said duct at the entrance side of said restricted orifice, a movable pressure responsive member operatively connected to said throttle, said member being subject on one side to the pressure in said duct at one side of the throttle and on the other side to a lower pressure, a second movable pressure responsive member subject on one side of the pressure in said duct between the throttle and the restricted orifice and on the other side to the said lower pressure, valve means for controlling the fluid operated servo-mechanism, and an operative connection between said second pressure responsive member and said valve means whereby the rate of fuel supply to the combustion chamber as controlled by the servo-mechanism is regulated by the throttle to have a desired relationship with the pressure in the supply pipe.

2. A control arrangement according to claim 1, in which the valve means controlling the servo-mechanism is actuated by a spring loaded lever having a thrust connection with the second pressure responsive member.

3. A control arrangement according to claim 1, in which the valve means controlling the servo-mechanism is actuated by a spring loaded lever having a thrust connection with the second pressure responsive member, and said lever is also operatively connected to a capsule responsive to an air pressure associated with the combustion chamber.

4. A control arrangement according to claim 1, in which the valve means controlling the servo-mechanism is actuated by a spring loaded lever contained in a chamber and supported in a diaphragm dividing the chamber into two compartments one of which contains said valve, the other compartment containing a capsule responsive to an air pressure associated with the combustion chamber and arranged to act on the lever in a direction for opposing closure of the said valve.

5. Means for regulating the supply of liquid fuel from a pump to a combustion chamber under the control of a fluid operated servo-mechanism which varies the supply of fuel from the pump comprising, in combination, a body, a by-pass duct in said body adapted to be connected to the main fuel supply pipe to the combustion chamber, restricted orifice means in said by-pass duct, a throttle in said duct at the entrance side of said restricted orifice, a movable pressure responsive member operatively connected to said throttle, said member being subject on one side to the pressure in said duct at one side of the throttle and on the other side to a lower pressure, a second movable pressure responsive member subject on one side to the pressure in said duct between the throttle and the restricted orifice and on the other side to the said lower pressure, valve means adapted to control the fluid operated servo-mechanism, and an operative connection between said second pressure responsive member and said valve means whereby the latter can be controlled in accordance with variations in pressure in the fuel supply pipe to effect a regulation in the rate of fuel supply in accordance with a function of said pressure determined by the throttle.

6. Means according to claim 5, comprising a spring loaded lever carrying the movable valve member for controlling the servo-mechanism, and a thrust connection between said lever and the second pressure responsive member.

7. Means according to claim 5, comprising a spring loaded lever carrying the movable valve member for controlling the servo-mechanism, a thrust connection between said lever and the second pressure responsive member, a capsule adapted to be responsive to an air pressure associated with the combustion chamber, and an operative connection between the capsule and the lever.

8. Means according to claim 5, comprising a spring loaded lever carrying the movable valve member for controlling the servo-mechanism, a thrust connection between said lever and the second pressure responsive member, a capsule adapted to be responsive to an air pressure associated with the combustion chamber, an operative connection between the capsule and the lever, a chamber containing the lever, a diaphragm supporting the lever and dividing the chamber into two compartments one of which contains said valve member, and the other of which contains said capsule, the capsule being arranged to act on the lever in a direction for opposing closure of said valve member.

RICHARD JOSEPH IFIELD.
JOSEPH JOHN RIGHTON.

References Cited in the file of this patent

UNITED STATES PATENTS

| Number | Name | Date |
|---|---|---|
| 2,440,663 | Ifield | Apr. 27, 1948 |
| 2,506,694 | Watson | May 9, 1950 |
| 2,604,756 | Greenland | July 29, 1952 |